(12) United States Patent
Thornton et al.

(10) Patent No.: US 8,375,436 B2
(45) Date of Patent: Feb. 12, 2013

(54) SESSION MIGRATION OVER CONTENT-CENTRIC NETWORKS

(75) Inventors: James D. Thornton, Redwood City, CA (US); Van L. Jacobson, Woodside, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 364 days.

(21) Appl. No.: 12/765,645

(22) Filed: Apr. 22, 2010

(65) Prior Publication Data

US 2011/0265174 A1 Oct. 27, 2011

(51) Int. Cl.
*H04L 29/06* (2006.01)
(52) U.S. Cl. ............................ 726/14; 726/11; 726/15
(58) Field of Classification Search ............... 726/14
See application file for complete search history.

(56) References Cited

U.S. PATENT DOCUMENTS

| | | | | |
|---|---|---|---|---|
| 6,173,364 | B1* | 1/2001 | Zenchelsky et al. | 711/118 |
| 6,772,333 | B1 | 8/2004 | Brendel | |
| 2002/0048269 | A1 | 4/2002 | Hong | |
| 2002/0138551 | A1* | 9/2002 | Erickson | 709/203 |
| 2006/0099973 | A1* | 5/2006 | Nair et al. | 455/461 |
| 2009/0037763 | A1* | 2/2009 | Adhya et al. | 714/4 |
| 2009/0103515 | A1* | 4/2009 | Pointer | 370/350 |
| 2010/0131660 | A1 | 5/2010 | Dee | |

FOREIGN PATENT DOCUMENTS

EP 2124415 A2 11/2009

OTHER PUBLICATIONS

Teemu Koponen and Andrey Ermolinskiy and Mohit Chawla and Kye Hyun Kim and Ion Stoica and Byung-gon Chun and Scott Shenker, "A data-oriented (and beyond) network architecture", In Proceedings of the ACM SIGCOMM Conference, Kyoto, Japan, Aug. 2007.*
Shneyderman, Alex et al., "Mobile VPN: Delivering Advanced Services in Next Generation Wireless Systems", Jan. 1, 2003, pp. 3-29.

* cited by examiner

*Primary Examiner* — Edward Zee
*Assistant Examiner* — Yogesh Paliwal
(74) *Attorney, Agent, or Firm* — Shun Yao; Park, Vaughan, Fleming & Dowler LLP (57) ABSTRACT

One embodiment of the present invention provides a system for facilitating session migration. During operation, the system receives a communication packet from a client destined to a remote server. The system determines whether the communication packet belongs to a pre-existing communication session, and whether session state information associated with the session is available locally. In response to the communication packet belonging to a pre-existing communication session and the session state information being unavailable locally, the system constructs an interest requesting the session state information, disseminates the interest over a network, and receives the session state information.

22 Claims, 7 Drawing Sheets

SESSION MIGRATION OVER CONTENT-CENTRIC NETWORKS

RELATED APPLICATION

The subject matter of this application is related to the subject matter of the following applications:

U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/603,336, entitled "ADAPTIVE MULTI-INTERFACE USE FOR CONTENT NETWORKING," by inventors Van L. Jacobson and James D. Thornton, filed 21 Oct. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009; the disclosures of which are incorporated by reference herein.

FIELD

The present disclosure relates generally to content-centric networks. More specifically, the present disclosure relates to a method for facilitating session migration over content-centric networks.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., IP address) closely associated with a physical object or location. This restrictive addressing scheme is becoming progressively more inadequate for meeting the ever-changing network demands.

The current architecture of the Internet revolves around a conversation model, which was created in the 1970s for the Advanced Research Project Agency Network (ARPANET) to allow geographically distributed users to use a few big, immobile computers. This architecture was designed under the influence of the telephone network, where a telephone number is essentially a program that configures the switches along a path from the source to the destination. Not surprisingly, the designers of the ARPANET never expected it to evolve into today's ubiquitous, relentlessly growing Internet. People now expect a lot more from the Internet than the ARPANET was designed for. Ideally, an Internet user should have access to any content, anywhere, at any time—access that is difficult to enable with the current location/device-binding TCP/IP (Transmission Control Protocol/Internet protocol) networks.

Content-centric networks (CCN), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system for facilitating session migration. During operation, the system receives a packet from a client destined to a remote server at an intermediary network device. The system determines whether the packet belongs to a pre-existing communication session, and whether state information associated with the session is available at the intermediary network device. In response to the communication packet belonging to a pre-existing communication session and the session state information being unavailable at the intermediary network device, the system constructs an interest requesting the session state information. The interest includes a hierarchically structured variable-length name. The system disseminates the interest over a network, and receives the session state information, thereby facilitating session migration.

In one variation on this embodiment, the system reconstructs the pre-existing communication session using the received session state information.

In one variation on this embodiment, the network comprises a content-centric network (CCN), and the interest is a CCN interest.

In one variation on this embodiment, the client is a mobile device, and the packet is a wireless Transmission Control Protocol (TCP) packet.

In a further variation, the interest is constructed based on a transport signature included in the wireless TCP packet, and the transport signature identifies the session.

In a further variation, the intermediary network device is located at a base transceiver station.

In one variation on this embodiment, the client is virtual private network (VPN)-enabled, and the packet is a VPN packet.

In a further variation, the interest is constructed based on a transport signature corresponding to a VPN tunnel.

In a further embodiment, the intermediary network device is a VPN host.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention facilitate efficient and secure migration of an established session from one intermediary network device to another. During operation, a client establishes a stateful communication session with an intermediary network device in order to receive content from a remote server. The intermediary network device (such as a proxy server) facilitates the session establishment, and provides the client with content retrieved form the remote server. Under certain circumstances, the client may transmit subsequent packets intended for the same session to a different intermediary network device. Upon receiving a packet for an existing session, the second intermediary device disseminates a content-centric-network (CCN) interest to other intermediary devices, such as neighboring devices, requesting state information associated with the session to which the received packet belongs. In response to receiving such an interest, the intermediary device which has originally established the session transmits the state information associated with the session to the requesting intermediary device, which can then use the session state to resume the original session. As explained in more details below, using CCN interest to obtain state information allows graceful and simple transfer of state information between intermediary network devices.

Content Centric Network

In a content-centric network (CCN), communication is driven by the consumers of data. In a CCN, there are two packet types: interest and data.

An interest packet (also called a query) is a request for some content. An interest packet encodes a special form of query that expresses what content is desired and what content is not desired. A data packet (also called a content packet) is a unit of content. Data packets are self-identifying by carrying within them their full name. A consumer asks for content by broadcasting its interest over all available connectivity. Any node hearing the interest and having data that satisfies it can respond with a data packet. A data packet is transmitted only in response to an interest and consumes that interest. Both interest and data identify the content being exchanged by the content name (or CCN name) included in the packet. Data "satisfies" an interest if the CCN name in the interest packet is a prefix of the CCN name in the data packet.

CCN names are opaque, binary objects composed of an explicitly specified number of components. In addition, CCN names are persistent and content-specific. That is, if one changes the content of a file or data object, the content is effectively associated with a new name. This persistency can be achieved with an explicit versioning mechanism, in which, for example, the new content can be "version 4" of a given name. The persistency can also be achieved implicitly. For example, contents can be associated with not only their human-established names, but also with authentication metadata (e.g., a digital signature by the publisher of the content). As a result, the complete content name changes when the data associated with a given name changes.

Functionally, a CCN can retain associations between various names and the content which they represent. Unlike conventional IP addresses, CCN names are not required to be fixed in length. In fact, an individual component of a CCN name may have an arbitrary length. In addition, it is desirable to construct CCN names that can represent organizational structures for content. In one embodiment, the CCN names are hierarchical and can be at least partially readable and meaningful to humans. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCN allows the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (P1(1) which that user has chosen to trust.

The unique properties of CCN can also provide solutions for distributed network service virtualization. Such distributed service virtualization is important in implementations of mobile backhaul services and virtual private network (VPN) services.

Virtualized Services for Mobile Devices

Embodiments of the present invention can be applied in a variety of network environment. For example, embodiments of the present invention facilitate efficient session migration and state transfer during handoff in mobile networks.

Figure 1:
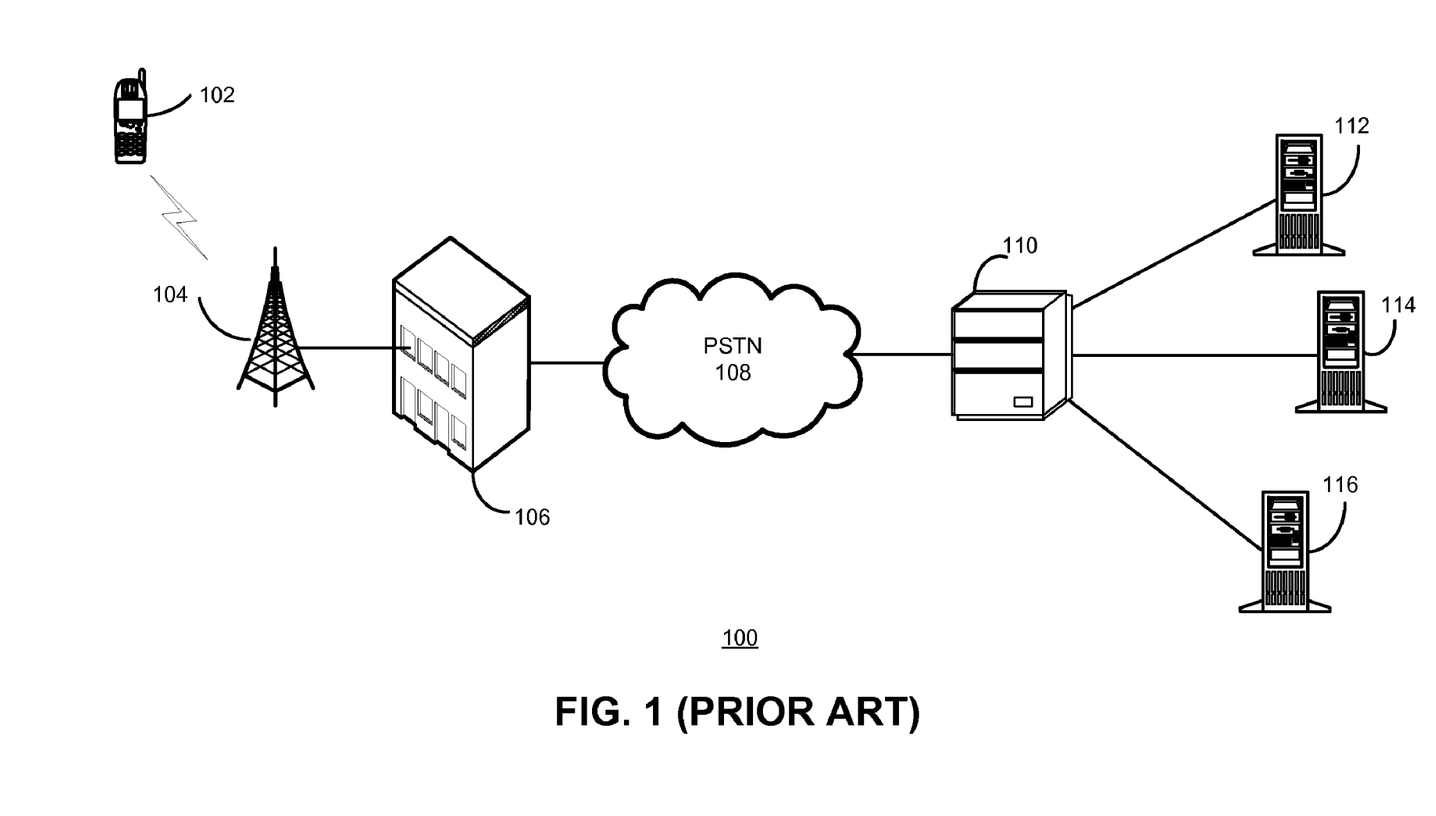
FIG. 1 presents a diagram illustrating the architecture of a conventional mobile backhaul network (prior art).

FIG. 1 presents a diagram illustrating the architecture of a conventional mobile backhaul network (prior art). Mobile backhaul network 100 includes a base transceiver station (BTS) 104, a service provider central office 106, a PSTN (public switched telephone network) 108, a proxy server 110, and a number of data servers 112-116.

During operation, in order to obtain certain data content from data servers 112-116, a mobile device (such as a smart phone) 102 transmits request signals, which are received by BTS 104. BTS 104 communicates with base station controllers located in central office 106. Base station controllers are responsible for aggregating voice and data traffic and maintaining timing and other management synchronizations. Traditionally, the communication between base stations and base station controllers is carried over TDM leased lines, such as a DS0/E1 circuit. The request from mobile device 102 is then routed via PSTN 108 to a proxy server 110, which then selects one of the data servers 112-116 to forward the request based on load-balancing requirements of the data servers. As the number of mobile users increases, the amount of data traffic also increases. As a result, proxy server 110 needs to handle a large number of mobile-data-access requests, which becomes increasingly challenging. For example, a large-scale network address translator (NAT) is needed at proxy server 110 to allocate dynamic, private IP addresses to the mobile devices seeking connections. In addition, because data servers can be geographically dispersed, a centralized proxy server may result in unwanted delays, especially in cases where clients are physically closer to the data server than to the proxy server.

Instead of using a centralized proxy server to handle data requests including assigning IP addresses, embodiments of the present invention provides a method that implements distributed proxy servers that can handle user data requests. In one embodiment, the service used by the mobile device, which can be for example a web service, is virtualized over a CCN.

Figure 2:
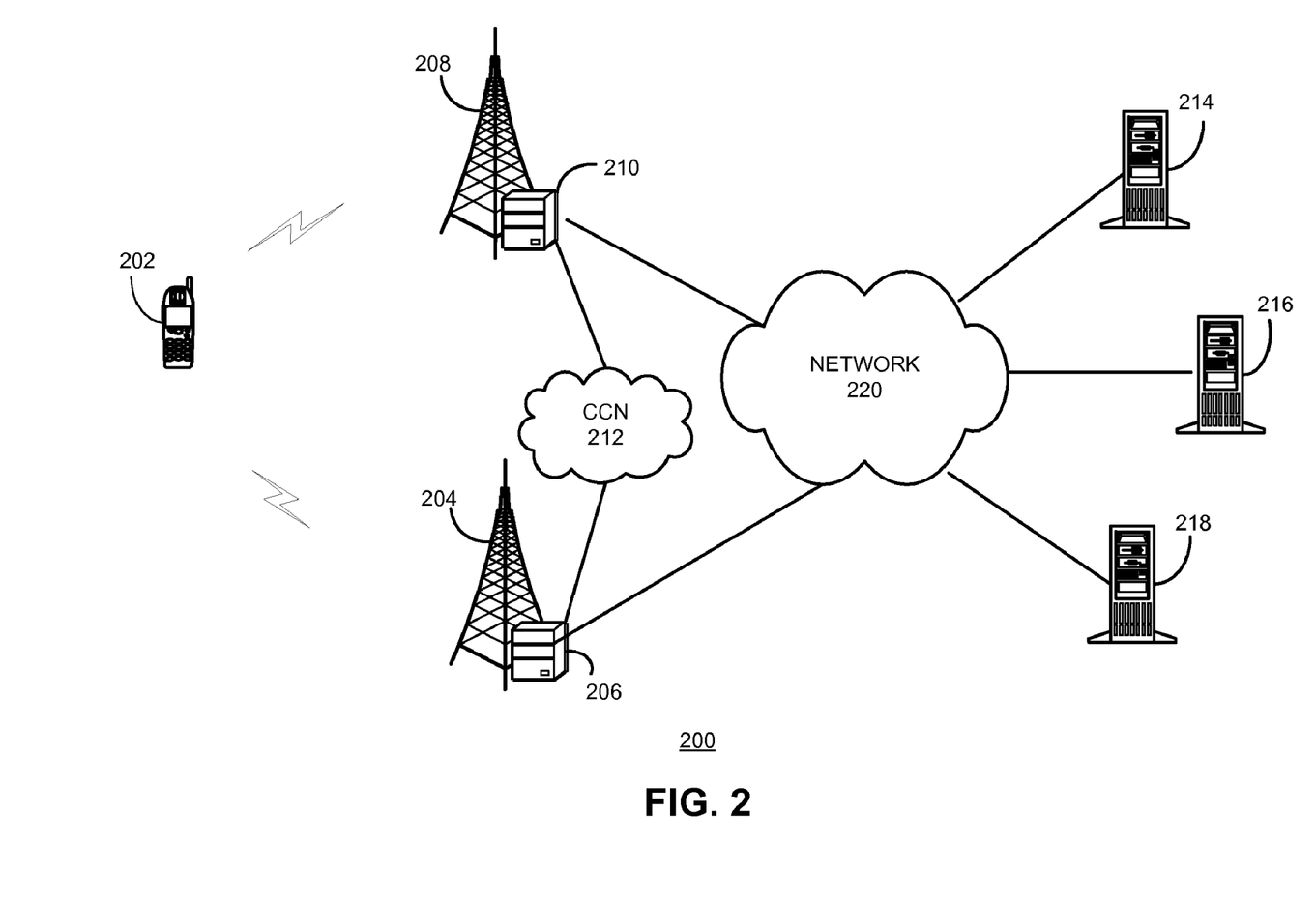
FIG. 2 provides a diagram illustrating exemplary architecture of a mobile backhaul network in accordance with an embodiment of the present invention.

FIG. 2 provides a diagram illustrating exemplary architecture of a mobile backhaul network in accordance with an embodiment of the present invention. Mobile backhaul network 200 includes a number of base transceiver stations, such as BTS 204 and BTS 208, a CCN 212, a network 220, and a number of data servers 214-218. Each BTS includes a CCN proxy server coupled to CCN 212. For example, BTS 204 includes a CCN proxy server 206, and BTS 208 includes a CCN proxy server 210. CCN proxy servers 206 and 210 are configured to facilitate mobile service virtualization. In one embodiment, CCN proxy server 206 establishes a communication session, such as a Transmission Control Protocol (TCP) session, with a mobile device 202. The communication session can migrate from one proxy server to another in a way transparent to mobile device 202. Remote data servers 214 to 218 are coupled to CCN proxy servers 206 and 210 via network 220, which can be a CCN or a conventional TCP/IP network. Proxy servers 206 and 210 serve requests from mobile device 202 by funneling content from remote servers 214-218 to mobile device 202.

During operation, mobile device 202 initially establishes a stateful communication session, such as a TCP session with proxy server 206 located at the BTS 204. The TCP session between mobile device 202 and CCN proxy server 206 is established using a standard three-way handshaking process. Information associated with the session state, such as a session identifier, is stored in CCN proxy server 206. In one embodiment, the session identifier can be the 5-tuple transport signature, which includes {source IP address, source port number, destination IP address, destination port number, connection type}, where "connection type" identifies the transport-layer protocol, such as "TCP" or "UDP" (user datagram protocol).

In one embodiment, data servers 214-218 are coupled to CCN proxy servers 206 and 210 via network 220, which can be a CCN. In the case where network 220 is a CCN, CCN proxy server 206 "translates" the request, such as a hypertext transfer protocol (HTTP) request, into a CCN interest packet, and broadcasts the interest to all data servers via network 220. Upon receiving the CCN interest, one of the data servers responds the interest with the requested content. CCN proxy server 206 then forwards the content to mobile device 202, and caches the content locally for future use. Note that CCN proxy server 206 can convert a CCN data packet from data server 214 into a TCP/IP packet by converting the packet's CCN name content to TCP/IP header, using previously stored TCP session information. In a further embodiment, data servers 214-218 are coupled to CCN proxy servers 206 and 210 via conventional TCP/IP network. In such a scenario, CCN proxy server 206 can perform conventional load balancing function, and facilitates establishing a communication session between mobile device 202 and a remote data server, such as data server 214. Note that CCN proxy servers 206 and 210 can cache packets received from remote data servers 214-218.

Caching the content or packets from remote servers at CCN proxy servers 206 and 210 can reduce bandwidth consumption in network 220, which is often operated by other network carriers. For example, many mobile users may use their mobile devices to request a popular video clip from a video-content hosting website. Instead of establishing connections to the website for each mobile user, the CCN proxy servers located at base stations can provide cached copies to a number of mobile users, thus preventing excessive bandwidth consumption in network 220.

Within the lifetime of the session, such as in the middle of streaming video from a website, mobile device 202 may move out of the region (also called a cell) covered by BTS 204 and move into a region covered by BTS 208. Typically, when mobile device 202 travels from one cell to another, a standard mobile "handoff" process is performed to ensure that the remaining packets for the same session can be received at the new BTS with minimal packet loss. Consequently, packets for the same session from mobile device 202 are now received by proxy server 210 located at BTS 208.

Once CCN proxy server 210 located at BTS 208 receives a packet from mobile device 202, it can recognize that the packet belongs to a pre-existing session. However, CCN proxy server 210 does not have state information associated with the session, and is thus unable to resume the pre-existing session. For example, CCN proxy server 210 may not know the uniform resource locator (URL) of an ongoing HTTP connection. To obtain the state information, CCN proxy server 210 disseminates a CCN interest requesting state information associated with the packet to its neighboring proxy servers via CCN 212. Note that, because a mobile device only travels from one cell to one of its neighbors, most likely the state information is located at one of the neighboring base stations. Alternatively, the CCN interest can be broadcast to all other proxy servers coupled to CCN 212. In one embodiment, the interest is constructed based on the address of mobile device 202. Upon receiving such an interest, the previous CCN proxy server 206 satisfies the interest by transmitting the requested session state information to CCN proxy server 210. Using a CCN interest to acquire state information allows proxy server 210 to resume the session without knowing the identity of the prior proxy server (i.e., proxy server 206). Hence, this state "handoff" process imposes little overhead on a proxy server.

Upon receiving the state information associated with the session, CCN proxy server 210 can resume the communication session with mobile device 202. In other words, the communication session previously established between mobile device 202 and CCN proxy server 206 has now migrated to CCN proxy server 210. Note that such session migration is transparent to mobile device 202. From the point of view of mobile device 202, a continuous communication session remains while mobile device 202 travels from one cell to another.

In addition to placing CCN proxy servers at each BTS, in one embodiment of the present invention, a number of base transceiver stations are grouped together based on geographical affinity, with each group sharing a single CCN proxy server. In a further embodiment, the CCN proxy servers can be placed in the radio area network (RAN) center. Furthermore, in addition to proxy servers, other types of intermediary network devices, such as switches and routers, can also perform the aforementioned transparent session migration method.

Figure 3:
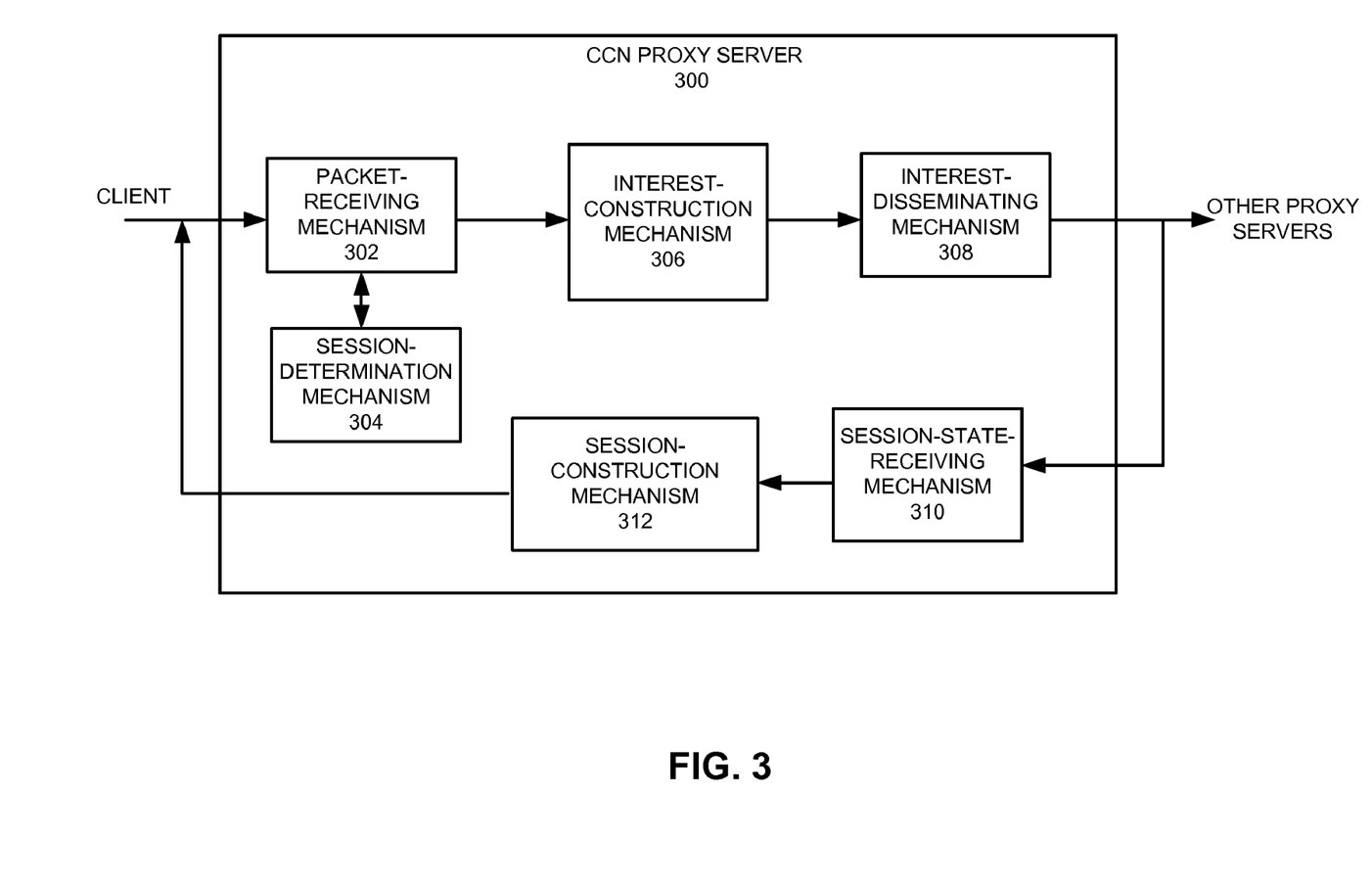
FIG. 3 provides a block diagram illustrating the structure of a CCN proxy server in accordance with an embodiment of the present invention.

FIG. 3 provides a block diagram illustrating the structure of a CCN proxy server in accordance with an embodiment of the present invention. CCN proxy server 300 includes a packet-receiving mechanism 302, a session-determination mechanism 304, an interest-construction mechanism 306, An interest-disseminating mechanism 308, a session-state-receiving mechanism 310, and a session-construction mechanism 312. Receiving mechanism 302 is configured to receive communication packets from a mobile device. Session-determination mechanism 304 is configured to determine whether the received packets belong to an existing communication session. If a received packet belongs to an existing session and CCN proxy server 300 does not have the session state information for reconstructing the session, interest-construction mechanism 306 is configured to construct an interest requesting session state information associated with the session. In one embodiment, the interest is constructed based on the client address, the sequence number of the packet, and other information identifying the packet. Interest-disseminating mechanism 308 disseminates the interest to neighboring proxy servers via the CCN. In response to such an interest, the proxy server holding the session state can respond with a data packet that includes the session state information. Session-state-receiving mechanism 310 is configured to receive such session state information. The received session state is then sent to session-construction mechanism 312, which can reconstruct the communication session using the session state. Once the session is resumed, CCN proxy server 300 can resume serving the mobile device with content either drawn from remote servers or being cached locally.

Figure 4:
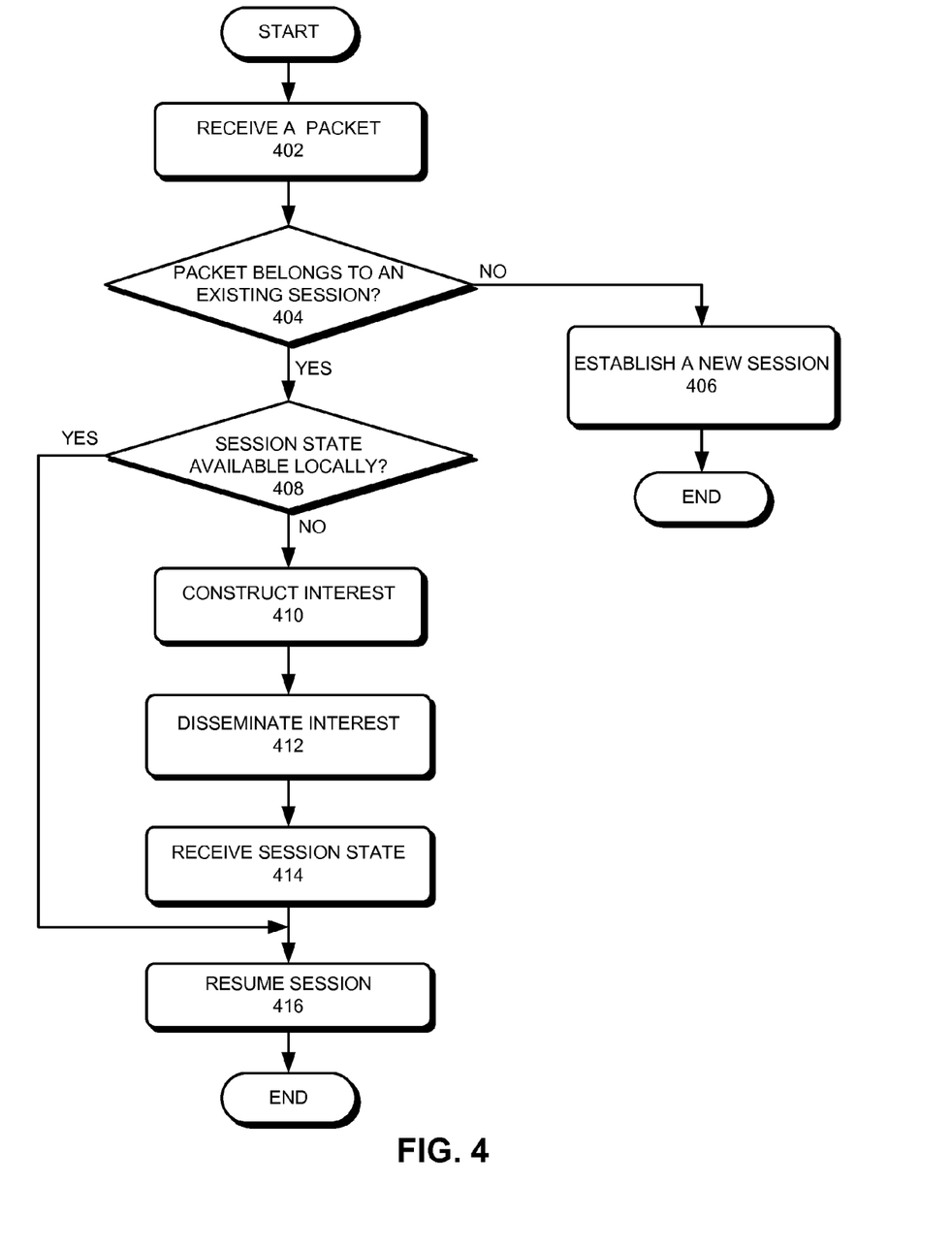
FIG. 4 presents a flowchart illustrating the process of session migration in accordance with an embodiment of the present invention.

FIG. 4 presents a flowchart illustrating the process of session migration in accordance with an embodiment of the present invention. During operation, a CCN proxy server receives a packet from a mobile device (operation 402). In one embodiment, the packet is a TCP/IP packet. The proxy server determines whether the received packet belongs to a pre-existing session (operation 404). For example, the received packet can be a new HTTP request of an existing session, or the received packet can be a new HTTP request trying to start a session with a remote server. In one embodiment, a session lookup based on the packet's 5-tuple session identifier is performed to determine whether the packet is a new connection requiring connection setup. If the received packet does not belong to any pre-existing session, the proxy server establishes a new session with the client (operation 406). In one embodiment, appropriate handshakes are performed between the client and the proxy server.

If the received packet does belong to an existing session, the proxy server determines whether it has session state information associated with the session (operation 408). If so, the proxy server resumes the session using the session state information (operation 416). If not, the proxy server constructs a CCN interest requesting session state information for the received packet (operation 410). In one embodiment, the proxy server constructs an interest based on the 5-tuple transport signature. Subsequently, the proxy server disseminate the interest to its neighboring proxy servers via CCN (operation 412), and receives a response from the proxy server at which the session is originally established (operation 414). After receiving the state information associated with the session, the proxy server reconstructs the session state, thus allowing the session to resume on the proxy server (operation 416).

Note that migration of the session from one proxy server to another is transparent to the mobile device, which is only aware of the connection to the remote server. For example, a mobile device user may travel from one cell to an adjacent cell while streaming videos from the Internet. To the user, the communication session between the mobile device and the Internet video server is uninterrupted. The user is unaware of the fact that the connection between his mobile device and the Internet video server has been handled by different proxy servers located at different base stations. Allowing proxy servers to be distributed at different base stations allows content caching at base stations, hence conserving bandwidth in the mobile backhaul network.

Virtualized VPN Services

In addition to virtualization of mobile services, the ability to allow session state to migrate from one intermediary network device to another can also enable the virtualization of virtual private network (VPN) services. A VPN is a network that uses a public telecommunication infrastructure, such as the Internet, to provide remote offices or individual users with secure access to their organization's network. A VPN maintains privacy by using security procedures and tunneling protocols. Tunneling is the process of placing an entire packet within another packet and sending it over a network. The protocol of the outer packet is understood by the network and both points where the packet enters and exits the network. For example, a user can place a packet that uses a protocol not supported on the Internet inside an IP packet and send it safely over the Internet. A user can also place a packet that uses a private (non-routable) IP address inside a packet that uses a globally unique IP address to extend a private network over the Internet.

Figure 5:
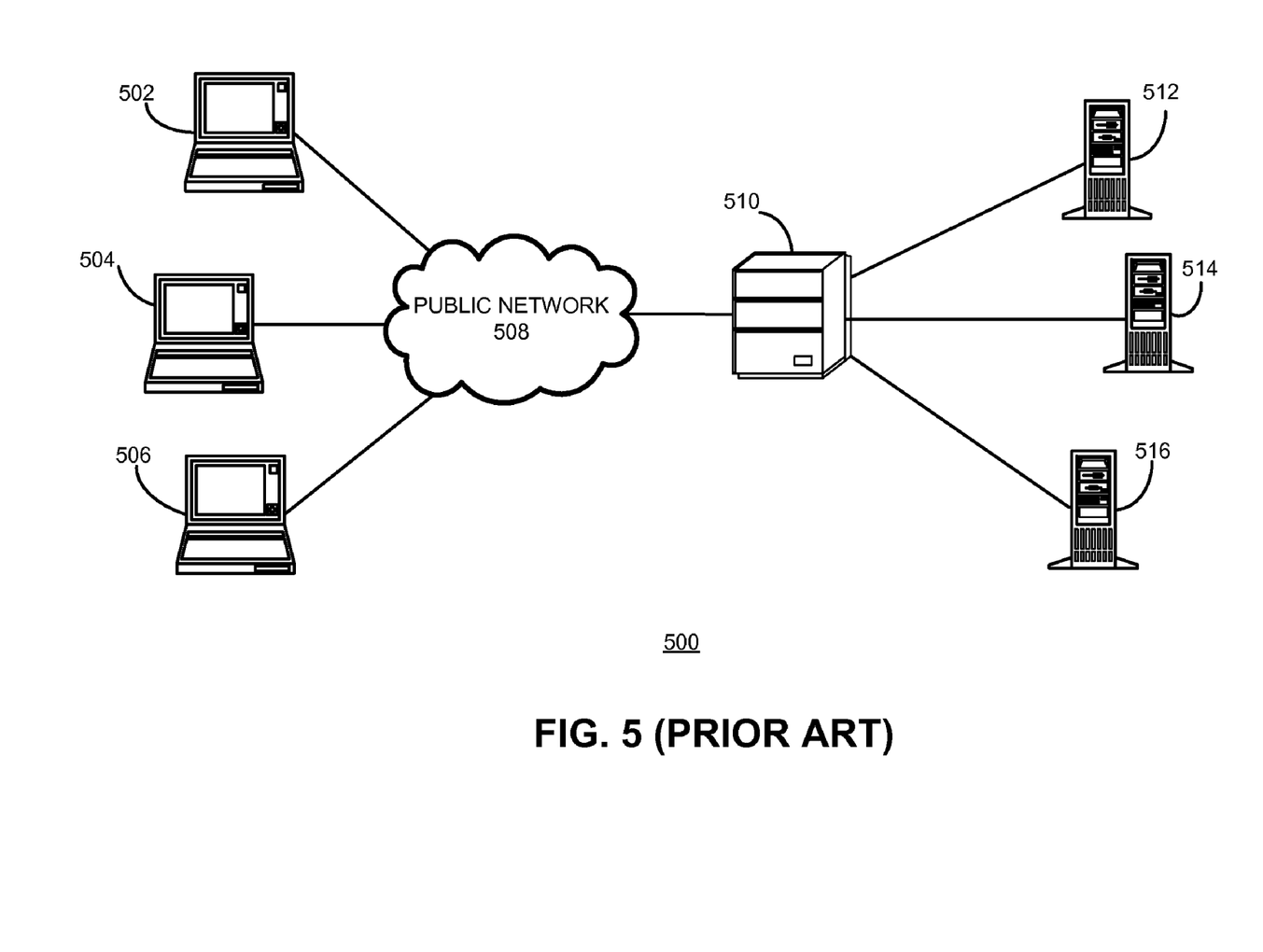
FIG. 5 presents a diagram illustrating exemplary architecture of a virtual private network (VPN)-enabled network (prior art).

FIG. 5 presents a diagram illustrating exemplary architecture of a VPN-enabled network (prior art). VPN-enabled network 500 includes a number of clients 502-506, a public network 508, a VPN host 510, and a number of enterprise servers 512-516. In order to access an enterprise server (such as server 512) securely, a client (such as client 502) establishes a communication tunnel with a border gate way, such as VPN host 510, which is configured to terminate the secure point-to-point communication tunnel, validate the identification of the user, and perform load balancing among enterprise servers 512-516.

Modern workers are constantly on the move. For example, a worker may want to establish a VPN tunnel at home, and continue to use the same VPN tunnel during his train ride to his office. In addition, the proliferation of smart phones also means more employees are connecting to their company's VPN hosts using smart phones. The mobility of the VPN connection points can result in existing VPN tunnels migrating from one VPN host to another. However, during such tunnel migration, the VPN tunneling states also need to be transferred from the previous host to the new host to ensure that the VPN tunneling can resume properly on the new host.

Figure 6:
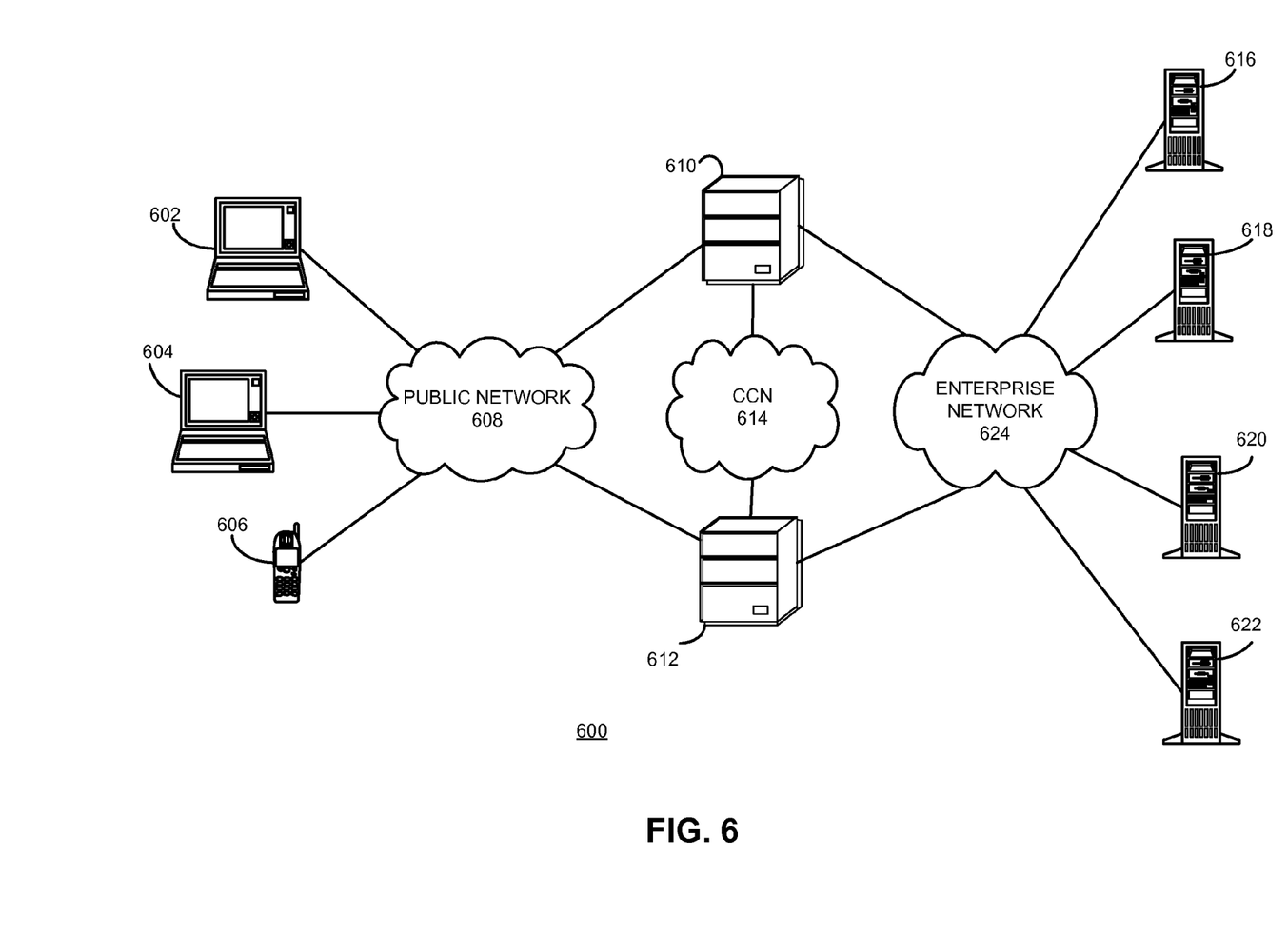
FIG. 6 presents a diagram illustrating exemplary architecture of a VPN-enabled network in accordance with an embodiment of the present invention.

In a CCN, such an issue can be resolved. FIG. 6 presents a diagram illustrating exemplary architecture of a VPN-enabled network in accordance with an embodiment of the present invention. VPN-enabled network 600 includes a number of clients 602-606, a public network 608, a number of VPN hosts 610-612, a CCN 614, an enterprise network 624, and a number of enterprise servers 616-622. VPN hosts 610 and 612 are coupled to each other via CCN 614. Enterprise servers 612-622 are coupled to VPN hosts 610 and 612 via enterprise network 624, which can be a CCN or a conventional TCP/IP network. In order to facilitate the secure communication between clients 602-606 and enterprise servers 616-622, a secure VPN can be established between a client and a VPN host. For example, the system can set up a VPN tunnel between client 602 and VPN host 610. After the establishment of the VPN tunnel, client 602 can access enterprise servers 616-622. In other words, packets from client 602 are forwarded to corresponding enterprise servers by VPN host 610. In one embodiment, VPN host 610 converts the received packet from the client, such as a TCP/IP packet to the format of CCN interest and data packets. Similarly, VPN host 610 also converts CCN interest and data packets from the enterprise servers into appropriate packet formats that can be understood by the client. In a further embodiment, VPN host 610 also performs load balancing.

Subsequently, client 602 moves from one location to another, and establishes a connection with VPN host 612. As a result, communication packets from client 602 for the existing VPN tunnel now arrive at VPN host 612. In response to receiving such a packet, VPN host 612 determines that the packet belongs to an ongoing VPN tunnel. In addition, VPN host 612 also determines that it does not have state information associated with the ongoing VPN tunnel. Such information is important for resumption of the VPN tunnel since it may contain important encryption information. Subsequently, VPN host 612 constructs a CCN interest requesting state information associated with the VPN tunnel and disseminates the interest to other VPN hosts over the CCN. In one embodiment, the CCN interest is broadcast to all other VPN hosts. In a further embodiment, the CCN interest is constructed based on the TCP 5-tuple transport signature included in the packet. After receiving such an interest, VPN host 610 can determine that it has the requested tunnel state, and transmit such information to VPN host 612 using a CCN data packet via CCN 614. VPN host 612 can then reconstruct the VPN tunnel state using the received information, and resumes the VPN tunnel. Note that the migration of the tunnel between VPN hosts is transparent to the client. From the point of view of client 602, a continuous VPN tunnel is maintained while it changes location.

Computer and Communication System

Figure 7:
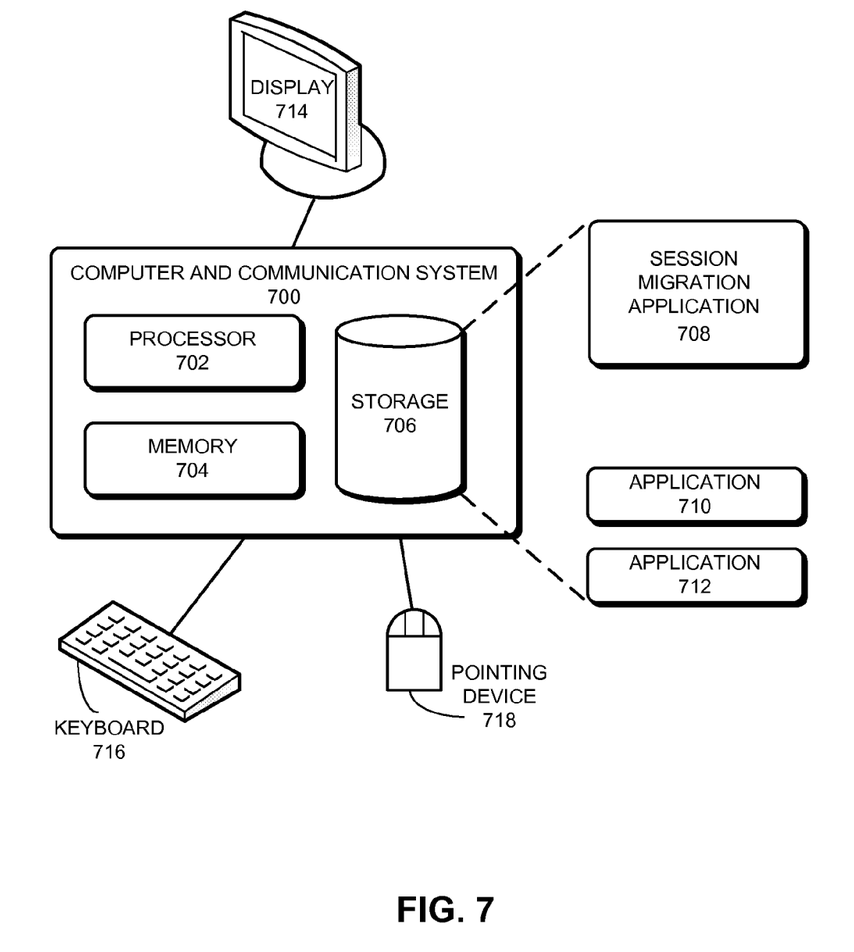
FIG. 7 presents an exemplary computer system for facilitating session migration over a CCN in accordance with an embodiment of the present invention.

FIG. 7 presents an exemplary computer system for facilitating session migration over a CCN in accordance with an embodiment of the present invention. In FIG. 7, a computer and communication system 700 includes a processor 702, a memory 704, and a storage device 706. Storage device 706 stores programs to be executed by processor 702. Specifically, storage device 706 stores a session migration application 708, as well as other applications, such as applications 710 and 712. During operation, session migration application 708 is loaded from storage device 706 into memory 704 and then executed by processor 702. While executing the program, processor 702 performs the aforementioned functions. Computer and communication system 700 is coupled to an optional display 714, keyboard 716, and pointing device 718.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating session migration, comprising:
   receiving, at an intermediary network device, a communication packet from a client destined to a remote server;
   determining whether the communication packet belongs to a pre-existing communication session;
   determining whether state information associated with the communication session is available at the intermediary network device;
   in response to the communication packet belonging to the pre-existing communication session and the session state information being unavailable, constructing a content-centric network (CCN) interest packet corresponding to the communication session based at least on an address of the client and a sequence number of the communication packet, wherein the interest packet comprises a first CCN name, which is a location-independent hierarchically structured variable-length name;
   disseminating the interest packet over a network; and
   receiving a session-data packet in response to disseminating the interest packet, wherein the session-data packet includes a second CCN name whose prefix matches the first CCN name included in the interest packet, and wherein the session-data packet includes the session state information, thereby facilitating session migration.

2. The method of claim 1, further comprising reconstructing the pre-existing communication session using the received session state information.

3. The method of claim 1, wherein the client is a mobile device, and wherein the communication packet is a wireless Transmission Control Protocol (TCP) packet.

4. The method of claim 3, wherein the interest packet is constructed based on a transport signature included in the wireless TCP packet, and wherein the transport signature identifies the session.

5. The method of claim 3, wherein the intermediary network device is located at a wireless base transceiver station.

6. The method of claim 1, wherein the client is virtual private network (VPN)-enabled, and wherein the communication packet is a VPN packet.

7. The method of claim 6, wherein the interest packet is constructed based on a transport signature corresponding to a VPN tunnel.

8. The method of claim 6, wherein the intermediary network device is a VPN host.

9. A system, comprising:
a number of intermediary network devices coupled to a network, wherein at least one intermediary network device comprises:
a processor;
a memory storing instructions that when executed by a computer cause the computer to perform a method for facilitating session migration, the method comprising:
receiving a communication packet from a client destined to a remote server;
determining whether the communication packet belongs to a pre-existing communication session;
determining whether state information associated with the communication session is available at the intermediary network device;
constructing a content-centric network (CCN) interest packet corresponding to the communication session based at least on an address of the client and a sequence number of the communication packet, in response to the communication packet belonging to the pre-existing communication session and the session state information being unavailable at the intermediary network device, wherein the interest packet comprises a first CCN name, which is a location-independent hierarchically structured variable-length name;
disseminating the interest packet over the network; and
receiving a session-data packet in response to disseminating the interest packet, wherein the session-data packet includes a second CCN name whose prefix matches the first CCN name included in the interest packet, and wherein the session-data packet includes the session state information, thereby facilitating session migration.

10. The system of claim 9, wherein the method further comprises reconstructing the pre-existing communication session using the received session state information.

11. The system of claim 9, wherein the client is a mobile device, and wherein the communication packet is a wireless Transmission Control Protocol (TCP) packet.

12. The system of claim 11, wherein the interest packet is constructed based on a transport signature included in the wireless TCP packet, and wherein the transport signature identifies the session.

13. The system of claim 11, wherein the intermediary network devices are located at base transceiver stations.

14. The system of claim 9, wherein the client is virtual private network (VPN)-enabled, and wherein the communication packet is a VPN packet.

15. The system of claim 14, wherein the interest packet is constructed based on a transport signature corresponding to a VPN tunnel.

16. The system of claim 14, wherein the intermediary network devices are VPN hosts.

17. A non-transitory computer-readable storage medium storing instructions that when executed by a computer cause the computer to perform a method for facilitating session migration, the method comprising:
receiving, at an intermediary network device, a communication packet from a client destined to a remote server;
determining whether the communication packet belongs to a pre-existing communication session;
determining whether state information associated with the session is available at the intermediary network device;
in response to the communication packet belonging to the pre-existing communication session and the session state information being unavailable at the intermediary network device, constructing a content-centric network (CCN) interest packet corresponding to the communication session based at least on an address of the client and a sequence number of the communication packet, wherein the interest packet comprises -a first CCN name, which is a location-independent hierarchically structured variable-length name;
disseminating the interest over a network; and
receiving a session-data packet in response to disseminating the interest packet, wherein the session-data packet includes a second CCN name whose prefix matches the first CCN name included in the interest packet, and wherein the session-data packet includes the session state information.

18. The storage medium of claim 17, wherein the method further comprises reconstructing the pre-existing communication session using the received session state information.

19. The storage medium of claim 17, wherein the client is a mobile device, and wherein the communication packet is a wireless TCP packet.

20. The storage medium of claim 19, wherein the interest packet is constructed based on a transport signature included in the wireless TCP packet, and wherein the transport signature identifies the session.

21. The storage medium of claim 19, wherein the intermediary network device is located at a base transceiver station.

22. The storage medium of claim 17, wherein the client is virtual private network (VPN)-enabled, and wherein the communication packet is a VPN packet.

* * * * *